United States Patent [19]
Ishimatsu et al.

[11] Patent Number: 6,018,406
[45] Date of Patent: Jan. 25, 2000

[54] OPTICAL REPEATER AND OPTICAL TRANSMISSION SYSTEM

[75] Inventors: Hirokazu Ishimatsu; Takashi Watanabe, both of Tokyo, Japan

[73] Assignee: Oki Electric Industry Co., Ltd., Tokyo, Japan

[21] Appl. No.: 08/942,532

[22] Filed: Oct. 2, 1997

[30] Foreign Application Priority Data

Oct. 4, 1996 [JP] Japan ................................. 8-264088
Sep. 16, 1997 [JP] Japan ................................. 9-269252

[51] Int. Cl.[7] .................................................. H04B 10/02
[52] U.S. Cl. ............................ 359/174; 359/110; 359/134
[58] Field of Search .................................. 359/174, 175, 359/176, 177, 179, 110, 160, 341, 333, 345, 124, 134

[56] References Cited

U.S. PATENT DOCUMENTS

| | | | |
|---|---|---|---|
| 5,274,496 | 12/1993 | Fujiwara et al. | 359/177 |
| 5,299,048 | 3/1994 | Suyama | 359/179 |
| 5,500,756 | 3/1996 | Tsushima et al. | 359/174 |
| 5,768,000 | 6/1998 | Tajima | 359/177 |
| 5,790,289 | 8/1998 | Taga et al. | 359/124 |
| 5,875,046 | 2/1999 | Tomooka et al. | 359/174 |

OTHER PUBLICATIONS

"Supervisory Options for Fibre Optical Amplifier Systems", A. Hadjifotiou et al.; Proceedings of the Conference on Telecommunications, Apr. 18, 1993; No. Conf. 4; pp. 53–56.
"In–Service Supervisory EDFA–Repeated Wavelength Division Multiplexing Transmission System"; Y.K. Chen et al.; IEEE Photonics Technology Letters, vol. 7, No. 8; Aug. 1, 1995, New York; pp. 923–925.
Patent Abstract of Japan, English–language Abstract of JP 07/202306A (Aug. 4, 1995), vol. 095, No. 011, published Dec. 26, 1995.

*Primary Examiner*—Kinfe-Michael Negash
*Attorney, Agent, or Firm*—Rabin & Champagne, P.C.

[57] ABSTRACT

To effectively collecting information necessary for maintenance of the optical transmission system from each optical repeater equipment, in an optical transmission system of the wavelength division multiplexing type according to this invention, a repeater unit 210-1 in optical repeater equipment 200 detects the wavelengths of optical signals λ1 to λq', the directions of optical signals, the transmission line ID Nos., and so on by using an optical couplers 211, 219, demultiplexers 212, 213, O/E converters 214-1~p, 215-1~q, and local oscillators 216-1~p, 217-1~q, and a supervisory control signal, including information about the detection results and a light amplifier 218, is sent to optical terminal equipment 100.

14 Claims, 7 Drawing Sheets

Fig. 6

| LINE ID NO. | WAVELENGTH OF LIGHT | DIRECTION OF TRANSMISSION | OPTICAL FIBER NO. | OPTICAL AMPLIFIER NO. | OPTICAL FIBER NO. | OPTICAL AMPLIFIER NO. | OPTICAL FIBER NO. |
|---|---|---|---|---|---|---|---|
| 1 | 1.533 μm | UPSTREAM | A1 | NO. 1 | A2 | NO. 4 | A3 |
| 2 | 1.533 μm | UPSTREAM | B1 | NO. 2 | B2 | NO. 5 | B3 |
| | 1.541 μm | UPSTREAM | B1 | NO. 2 | B2 | NO. 5 | B3 |
| | 1.549 μm | DOWNSTREAM | B1 | NO. 3 | B2 | NO. 6 | B3 |
| | 1.557 μm | DOWNSTREAM | B1 | NO. 3 | B2 | NO. 6 | B3 |

OPTICAL REPEATER AND OPTICAL TRANSMISSION SYSTEM

BACKGROUND OF THE INVENTION

1. Field of the Invention

The present invention relates to an optical wavelength division multiplexing transmission system for transmitting multiplexed light formed by multiplexing light rays of a plurality of wavelengths, including transmitting signals, and more particularly to optical repeater equipment to relay optical signals on the transmission line without regenerating electric signals from the optical signals.

2. Related Art

In recent years, the optical transmission systems have spread extensively for reasons, such as wide transmission bandwidth, less transmission loss, immunity to electromagnetic induction disturbances, etc. In the optical transmission system, optical terminal equipment converts an electric signal into an optical signal, and this optical signal passes through generally one or more stages of optical repeater equipment to the opposite terminal equipment where the optical signal is converted into an electric signal. The optical transmission systems are roughly divided into two types according to the method by which the optical repeater equipment amplifies the optical signal. One type is the regenerative repeat method, in which the optical repeater equipment converts an optical signal into an electric signal, and, after amplification, converts this electric signal again into an optical signal to transmit further along the transmission line. The other type is the non-regenerative repeat method, in which the optical repeater equipment amplifies the optical signal and transmits it further along the line without converting the optical signal into an electric signal. Use of optical transmission system of the latter non-regenerative repeat type is now spreading because of advantages, particularly due to their recent practical application of feasible light amplifiers, which contributes to the greater ease of configuring the optical repeater equipment.

The optical transmission system that operates by the conventional non-generative repeat method uses one optical fiber and one light amplifier to transmit one signal along the transmission line, which arrangement is designed to facilitate the maintenance and the management of the optical transmission system.

FIG. 7 is a diagram showing the configuration of the conventional non-regenerative repeat type optical transmission system. In FIG. 7, pieces of optical terminal equipment 3000 has a group of subscribers 1000 and 6000 have respective groups of subscribers 1000, 2000. Pieces of equipment 3000 and 6000 respectively, convert subscriber signals from the subscribers 1000 and 2000 into optical signals with E/O converters, and transmit the optical signals to the other piece of optical terminal equipment 6000 and 3000 respectively through two pieces of optical repeater equipment 4000 and 5000. The pieces of optical repeater equipment 4000 and 5000 amplify the optical signals with their amplifiers and transmit the optical signals to the two pieces of optical terminal equipment 6000 and 3000. The pieces of optical terminal equipment 6000 and 3000 convert the optical signals into electric signals with their O/E converters, and distribute to the subscribers 2000, 1000.

In the non-regenerative repeat type optical transmission system, the pieces of optical repeater equipment 4000 and 5000 each have optical fibers and light amplifiers connected thereto both corresponding to the number n of optical signals to be relayed by the two pieces of optical repeater equipment. By this arrangement, the pieces of optical terminal equipment 3000 and 6000 to supervise the optical transmission system, can obtain the correspondence relationship among the wavelengths ($\lambda$1, $\lambda$2, ..., $\lambda$n) of light rays to be relayed, the traveling directions of the rays, and the light amplifiers for the rays. For example, therefore it is known that an optical signal of wavelength $\lambda$1 travels in the upstream direction through optical fibers 7000-1, 7100-1 and 7200-1, and this optical signal is amplified by the light amplifiers 8000-1 and 8100-1.

Because the above-mentioned correspondence relationship is grasped, even if a failure should occur in the optical fiber or the light amplifier, it is easy to replace the faulty optical fiber or light amplifier, or switch the transmission line, in which the failure has occurred, to the spare transmission line. Since normally the optical repeater equipment is an unmanned unit, it is required that information about the optical repeater equipment should be collected at a monitoring station in manned optical terminal equipment, or in supervisory equipment installed at a place remote from the optical transmission system. For this purpose, one supervisory control signal is allocated to one transmission line, and this supervisory control signal conveys information about the pieces of optical repeater equipment along the line to the monitoring station. For example, with the line of wavelength $\lambda$1, a supervisory control signal sv-1 conveys information about a light amplifier 8000-1 of optical repeater equipment 4000 and a light amplifier 8100-1 of optical repeater equipment 5000 to the monitor station.

In the conventional optical transmission system, however, when additional transmission lines are to be laid, in other words, when additional optical fibers and additional light amplifiers are added on, it is necessary to prepare circuits to receive and transmit supervisory control signals in proportion with the number of transmission lines additionally to be installed. For example, in the optical transmission system shown in FIG. 7, if three transmission lines are to be added, it is required to prepare 6 (3×2) circuits, including those circuits by which to receive and transmit supervisory control signals. As described above, a problem with the optical transmission system is that the cost of additional installation amounts to a large sum.

Meanwhile, wavelength division multiplexing (WDM), by which multiple wavelength signals are multiplexed along a single optical fiber, is becoming popularly employed in practical applications. By using this wavelength division multiplexing technique, it is possible to transmit a larger number of signals on a single optical fiber than the conventional optical transmission system described above. From a viewpoint of maintenance and management, it is still necessary to detect the correspondence relationship of the wavelengths of optical signals, transmission directions, transmission lines, optical amplifiers, etc. Despite this necessity, a technique to efficiently concentrate information obtained at the optical repeater equipment into the supervisory equipment has not been established.

SUMMARY OF THE INVENTION

Therefore, to solve this problem, optical repeater equipment according to one aspect of the present invention, which includes optical amplifiers, is installed between two pieces of optical terminal equipment, at least one of the two pieces of terminal equipment having a function to form a multiplexed optical signal by multiplexing a plurality of component rays of mutually different wavelengths, at least one of the two pieces of terminal equipment having a function to collect information for supervision of the transmission of the multiplexed optical signal such optical repeater equipment comprises: (a) extracting means for extracting part of the multiplexed light; (b) separating means for separating an extracted optical signal into component rays of mutually different wavelengths; (c) detecting means for detecting wavelengths of separated component rays; (d) generating means for generating a supervisory control signal including a signal showing detected wavelengths of the detected signals; and (e) sending means for sending the supervisory control signal in the direction of the optical terminal equipment having the information collecting function.

According to another aspect of the present invention, an optical transmission system comprises: (1) optical terminal equipment for forming multiplexed light by multiplexing a plurality of component rays of mutually different wavelengths; (2) supervisory equipment for collecting information for supervision of the transmission of the multiplexed light; and (3) optical repeater equipment including optical amplifiers for relaying the multiplexed light, wherein the optical repeater equipment comprises (a) extracting means for extracting part from the multiplexed light; (b) separating means for separating an extracted light into component rays of the different wavelengths; (c) detecting means for detecting wavelengths of separated component signals; (d) generating means for generating a supervisory control signal including a signal showing the detected wavelengths of the separated component rays; and (e) sending means for sending the supervisory control signal to the supervisory equipment, and wherein the supervisory equipment comprises creating means for creating a supervisory control table for supervision of the transmission of the multiplexed light.

The optical repeater equipment according to the present invention analyses the state of the transmission of the multiplexed light for every wavelength, and collects results of analysis in the form of a supervisory control signal in one place. Under this arrangement, even when an additional transmission line is installed, information on the supervised objects which increase with the addition of a transmission line can be collected using the current supervisory control signal, without adding on another supervisory control signal.

In the optical transmission system according to the present invention, the supervisory equipment, which monitors the state of the transmission of the multiplexed light, creates a supervisory control table necessary for supervision of the optical transmission system on the basis of the received supervisory control signal. Consequently, even if a failure occurs in the transmission line, the maintenance person can easily and accurately make a decision about the replacement of parts and the switching of lines.

BRIEF DESCRIPTION OF THE DRAWINGS

FIG. 6 is a supervisory control table for supervision of the optical transmission system.

DESCRIPTION OF THE PREFERRED EMBODIMENT(S)

Hereinafter, an embodiment of the wavelength division multiplexing type optical transmission system according to the present invention will be now described with reference to the accompanying drawings.

Figure 1:
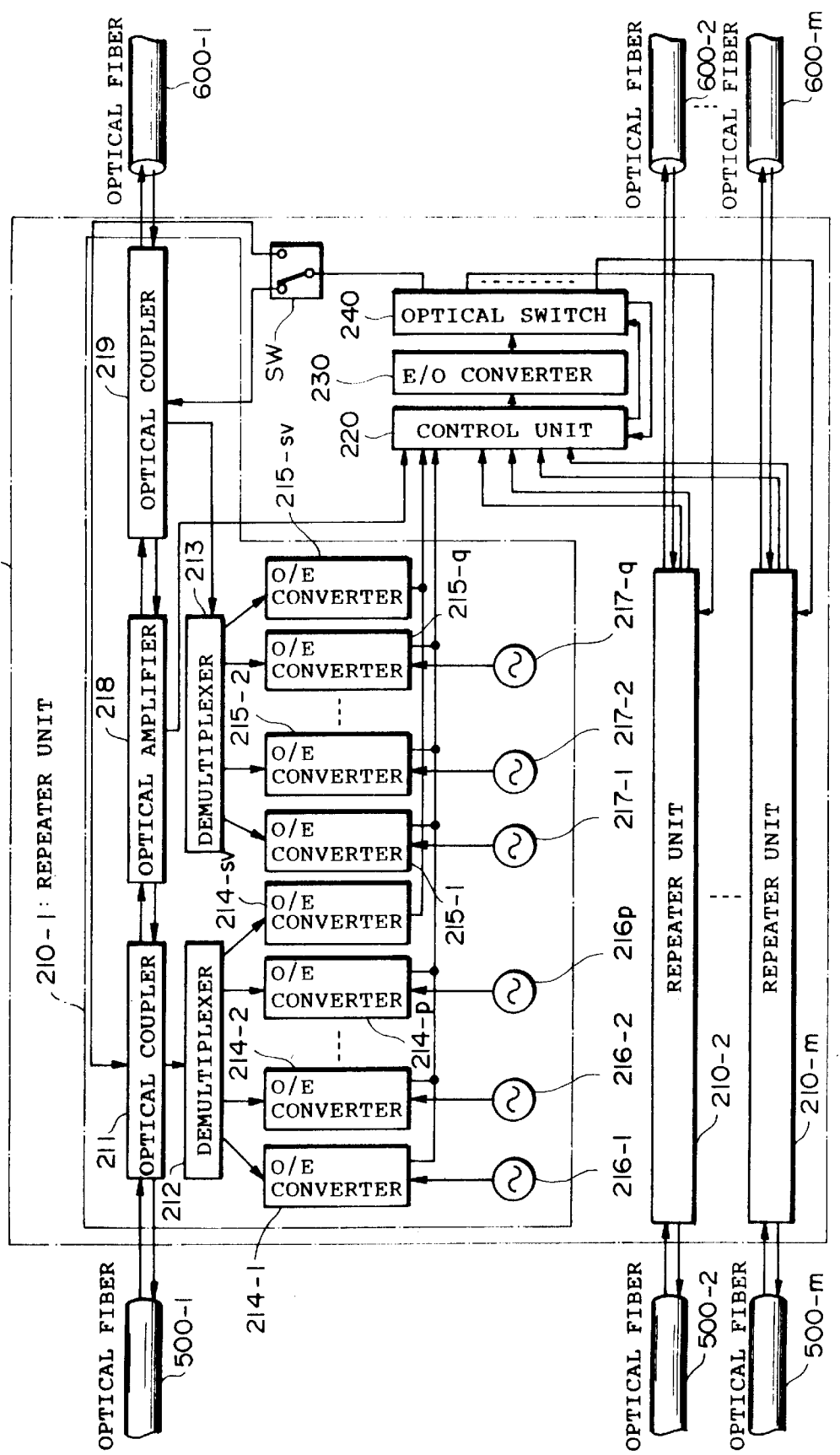
FIG. 1 is a diagram showing the configuration of the optical repeater equipment according to an embodiment of the present invention.
Figure 2:
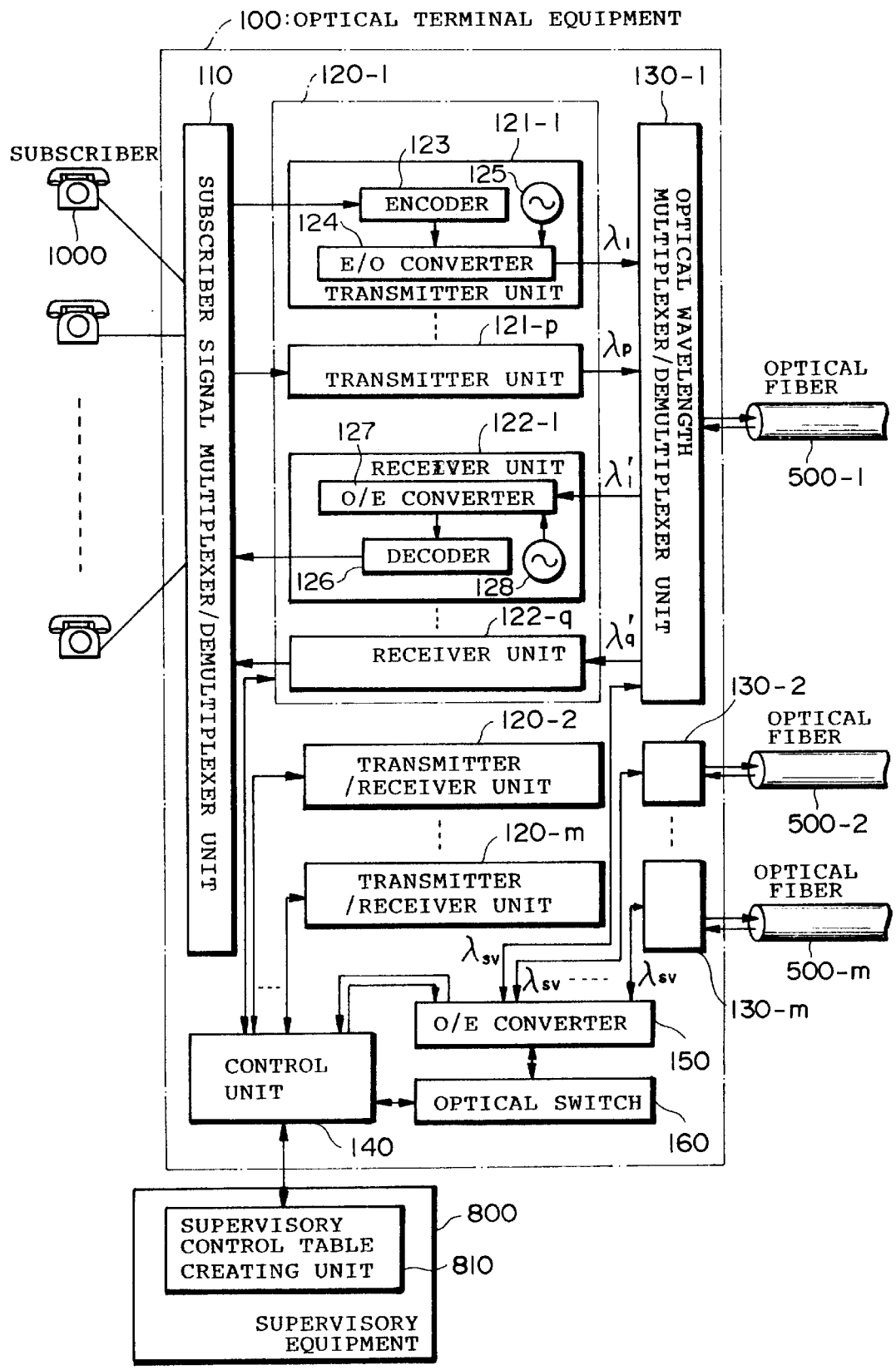
FIG. 2 is a diagram showing the configuration of the optical terminal equipment according to an embodiment of the present invention.
Figure 3:
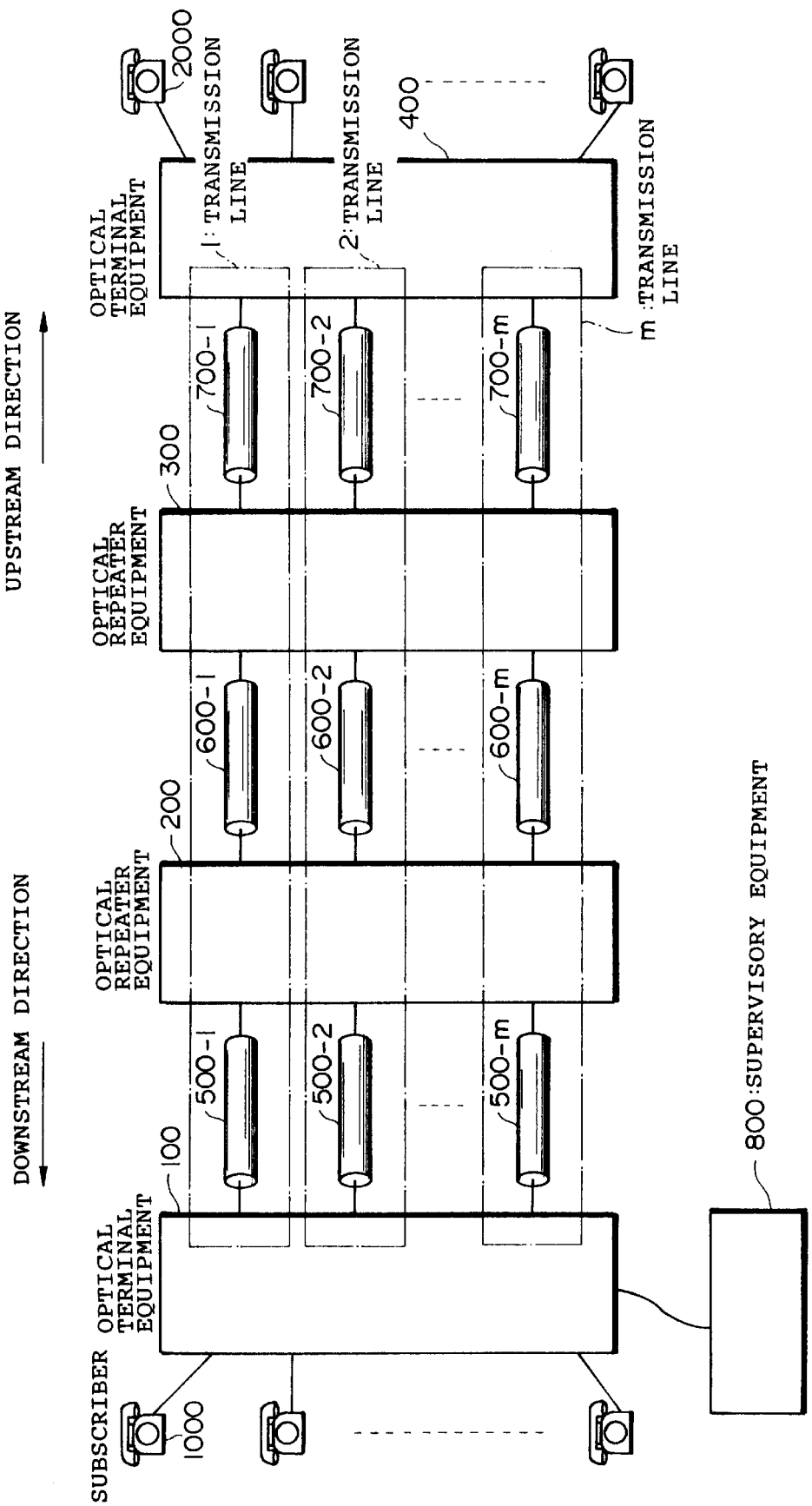
FIG. 3 is a diagram showing the configuration of the optical transmission system according to an embodiment of the present invention.

FIG. 1 is a diagram showing the configuration of the optical repeater equipment in the optical transmission system of the wavelength division multiplexing method according to an embodiment of the present invention. FIG. 2 is a diagram showing the configuration of the optical terminal equipment. FIG. 3 is a diagram showing the configuration of the optical transmission system using the optical terminal equipment in FIG. 2. For easier understanding, description will start with the overall optical transmission system referring to FIG. 3, and then move on to the optical repeater equipment and the optical terminal equipment referring to FIGS. 1 and 2.

As shown in FIG. 3, the optical transmission system comprises optical terminal equipment 100, two pieces of optical repeater equipment 200, 300, optical terminal equipment 400, optical fibers 500-1~m, 600-1~m, and 700-1~m, where m denotes the number of optical fibers, and supervisory equipment 800. The main functions of the optical terminal equipment 100 are firstly to transmit and receive a subscriber signal to and from a subscriber 1000, secondly to convert a subscriber signal into an optical signal and transmits it to the optical repeater equipment 200, thirdly to convert an optical signal received from the optical repeater equipment 200 into an electric signal, and lastly to transmit and receive signals necessary to supervise the optical transmission system. The other optical terminal equipment 400 on the other side, has the same functions. The main functions of the optical repeater equipment 200 are to amplify an optical signal from the optical terminal equipment 100 and transmit it to the optical repeater equipment 300, to amplify an optical signal from the optical repeater equipment 300 and transmit it to the optical terminal equipment 100, and to notify the state of the optical repeater equipment 200 to the optical terminal equipment 100. The other optical repeater equipment 300 has the same functions. To perform the above-mentioned functions, as shown in FIG. 2, the optical terminal equipment 100 comprises a subscriber signal multiplexer/demultiplexer unit 110, transmitter/receiver units 120-1~m, optical wavelength multiplexer/demultiplexer units 130-1~m, an O/E converter 150, and an optical switch 160. The subscriber signal multiplexer/demultiplexer unit 110 multiplexes the subscriber signals from the subscribers 1000 in time division and outputs the multiplexed signals to the transmitter/receiver units 120-1~m, demultiplexes the multiplexed signals into subscriber signals and outputs to the subscribers 1000. The transmitter/receiver units 120-1~m respectively include a plurality of transmitter units 121-1~p and a plurality of receiver units 122-1~q. Here, p denotes the number of wavelengths to be multiplexed into the optical signal transmitted in the upstream direction (to the right of the paper) and the q denotes the number of wavelengths to be multiplexed into the optical signal transmitted in the downstream direction (to the left of the paper) along the optical fiber 500-1. Note that any number of light rays may be multiplexed on the other optical fibers 500-2~m regardless of the numbers of light rays p and q multiplexed on the optical fiber 500-1.

In a transmitter unit 121-1 in the transmitter/receiver unit 120-1, an encoder 123 codes the subscriber signal from the subscriber signal multiplexer/demultiplexer unit 110. For example, it codes pursuant to the SDH (Synchronous Digital Hierarchy: e.g., STM-1, STM-4, STM-16, or STM-64). The E/O converter 124 converts the coded signal into an optical signal λ1 using LD (Laser Diode). The optical signal λ1 is modulated by a local oscillator 125 so as to be given a transmission line optical fiber ID No. In short, the local oscillator 125 provides the transmission line ID No. for the optical signal λ1. Herein, the transmission line ID, which is similar to the transmission line No. 1~m, serves to specify which line the optical signal travels on. For example, the encoder 123 in the transmitter/receiver unit 120-1 adds No. 1 of the transmission line 1 to the optical signal that travels along the line, and an encoder (not shown) in the transmitter/receiver unit 120-2 adds No. 2 of the transmission line 2 to the corresponding optical signal. Likewise, the other transmitter units perform the same functions. Consequently, the optical signal λ1 is output to the optical wavelength multiplexer/demultiplexer unit 130-1. Thereafter, the optical wavelength multiplexer/demultiplexer unit 130-1 multiplexes optical signals λ1 to λp, in other words, multiplexes the optical signals in wavelength division, and transmits the multiplexed optical signal to the optical fiber 500-1.

On the other hand, the optical wavelength multiplexer/demultiplexer unit 130-1 demultiplexes the optical signals λ1' to λq' received from the optical fiber 500-1, into component light rays of separate wavelengths, and outputs the separated light rays to the transmitter/receiver units 120-1~m. The receiver unit 122-1 in the transmitter/receiver unit 120-1 demodulates the optical signal λ1 using the local oscillator 128, thus obtaining the transmission line ID. Also, the O/E converter 127 converts the optical signal λ1' into an electric signal and the decoder 126 decodes the electric signal to output a decoded signal to the subscriber signal multiplexer/demultiplexer 110. The other receiver units 122-2~q work similarly. The subscriber signal multiplexer/demultiplexer unit 110 demultiplexes the signals from the receiver units 122-1~q in time division, and then outputs the time-division demultiplexed signals to the corresponding subscribers.

In addition, in case of transmitting the supervisory control optical signal λsv upstream, one of the optical wavelength multiplexer/demultiplexer outputs to the optical fiber connected thereto, the supervisory control optical signal λsv received from the optical switch 160. In other word, the supervisory control optical signal λsv is transmitted to the opposite optical equipment 400 via one of the optical fiber 500-1~m. Similarly, in case of transmitting the supervisory control optical signal λsv downstream, one of the optical wavelength multiplexer/demultiplexer outputs the supervisory control optical signal λsv received from the optical fiber connected thereto, to the optical switch 160.

The functions of the control unit 140, O/E converter 150, and the optical switch 160 depends upon the direction of transmission of the supervisory control optical signal λsv. When the supervisory control optical signal λsv is forwarded upstream, the control unit 140 generates an electrical supervisory control signal, the O/E converter 150 converts it into the supervisory control optical λsv, and the optical switch 160 outputs the optical signal to one of the optical wavelength multiplexer/demultiplexer unit 130-1. On the contrary when the supervisory control optical signal λsv is forwarded downstream, the optical switch 160 receives the supervisory control optical signal λsv from one of the optical wavelength multiplexer/demultiplexer unit, to output it to the O/E converter 150. Subsequently, the O/E converter 150 convert the electrical supervisory control optical signal λsv into the supervisory control signal, thus outputting it to the control unit 140.

The control unit 140 performs a specified signal conversion process, such as the U/B (Unipolar/Bipolar) conversion process, on the supervisory control signal received from the O/E converter 150, and outputs the signal to a supervisory control table creating unit 810 in the supervisory equipment 800. The control unit 140 also obtains information necessary for supervision and control of the optical transmission system from each of the transmitter/receiver units 120-1~m. For example, the control unit 140 receives information about BER (Bit Error Rate), switching of the transmission lines, etc., and sends the information to the supervisory equipment 800.

Hereinbelow, the description of the embodiment will focus on the states of optical transmission signal in the optical repeater equipment, which include, for example, the wavelengths of rays of light, the Nos. of the light amplifiers, the transmitting directions of optical signals, and the lines on which the optical signals travel.

The supervisory control table creating unit 810 in the supervisory equipment 800 creates a supervisory control table, which will be described later, on the basis of a supervisory control signal received, and supplies the maintenance person with this supervisory control table. Description will be made in more detail later of the receiving function of the optical terminal equipment 100 and the function of the supervisory equipment 800.

As shown in FIG. 1, the optical repeater equipment 200 according to an embodiment of the present invention comprises repeater units 210-1~m to relay downstream therefrom an optical signal sent from the optical terminal equipment 100, collects information by which to notify the states of transmission of the optical signal, and transmits a supervisory control signal to the adjacent optical terminal equipment or optical repeater equipment; a control unit 220 to generate a supervisory control signal from collected information; an E/O converter 230 to convert a generated supervisory control signal into a supervisory control light signal to convey the supervisory control signal; and an optical switch 240 to insert this supervisory control light signal into any of the transmission lines 1 to m.

In case of transmitting the optical signal upstream, the optical coupler 211 in the repeater unit 210-1 extracts light transmitted along the optical fiber 500-1, while in case of transmitting it downstream, the optical coupler 219 extract light transmitted along the optical fiber 600-1, The optical couplers 211 and 219 are formed, for example, by a bulk type coupler, a fiber fusion type coupler, or an optical waveguide type coupler. The main object of the optical coupler 211 and 219 is to extract part of the light, more specifically, partially extract light including all wavelength components. Therefore, any type of coupler will be available so long as it can extract light. However, considering loss of the optical signal by this light extraction, the ratio of the transmitted optical signal to the extracted optical signal should preferably be large.

An optical demultiplexer 212 partially demultiplexes upstream multiplexed light signal λ1 to λp, and similarly an optical demultiplexer 213 partially demultiplexes downstream multiplexed light signal λ1' to λq'. A supervisory control ray λsv is also extracted. To be more specific, the optical demultiplexer 212 disperses the former multiplexed light of λ1 to λp and the supervisory control light signal λsv into rays of wavelengths λ1, λ2, . . . λp, and λsv. On the other hand, the optical demultiplexer 213 disperses the latter multiplexed light signal λ1' to λq' and the supervisory control light signal λsv into rays of wavelengths λ1', λ2', . . . λq' and λsv. Those optical demultiplexers 212, 213 are each formed by a prism, interference film filter, diffraction grating or the like. O/E converters 214-1~p convert the dispersed component rays of wavelengths λ1 to λp respectively into electric signals. Similarly, O/E converters 215-1~q convert the dispersed component rays of wavelengths λ1' to λq' respectively into electric signals. In addition, O/E converters 214-sv and 215-sv convert the supervisory control rays λsv into supervisory control electric signals, and output the supervisory control electric signals to a control unit 220.

It ought to be noted that an optical signal having component rays of all wavelengths λ1 to λp multiplexed is not always received due to a dissimilar configuration of the optical transmission system, failures in equipment, and so on. Therefore, electric signals corresponding to the light rays of all wavelengths λ1 to λp are not always received. By deciding to which wavelengths the received electric signals correspond, it is known that the light of what wavelengths is received, that is, the wavelengths of the transmitted signals can be recognized. For example, if the received multiplexed light contains rays of wavelength λ1, an O/E converter 214-1 outputs an electric signal, but if the received multiplexed light does not contain rays of wavelength λ2, an O/E converter 214-2 does not output an electric signal, for which reason the presence of rays of wavelength λ1 and the absence of rays of wavelength λ2 are clarified.

The optical signals λ1~λp, and λ1'~λq' experience demodulating by the respective local oscillators 216-1~p, and 217-1~q, thereby giving the transmission line ID to the control unit 220. The other repeater units 210-1~m perform the same functions as in the repeater unit 210-1.

The control unit 220, as described above, decides the wavelengths of the light rays contained in the received multiplexed light by deciding whether or not it receives electric signals from the O/E converters 214-1~p and 215-1~q. For example, if a signal is received from the O/E converter 214-1, the control unit 220 decides that rays of wavelength λ1 has been received upstream, and if a signal is not received from the O/E converter 214-2, the control unit 220 decides that rays of wavelength λ2 has not been received. The control unit 220 decides the transmission lines on which the rays of respective wavelengths have traveled, based upon the lines Nos. 1 to m included in the signals demodulated by the local oscillators 216-1~p and 217-1~q. For example, if the line ID No. 1 is included in the signal demodulated by the local oscillator 216-1, the control unit 220 decides that the rays of wavelength λ1 have traveled upstream through the line 1, and if the line ID No. p is included in the signal demodulated by the local oscillator 216-p, the control unit 220 decides that the ray of wavelength λp have traveled upstream through the line p. Whereupon, the control unit 220 adds information received from the repeater units 210- 1~m, such as the wavelength of the rays transmitted, the line along which the rays have traveled, the light amplifier, and so on in specified time slots in supervisory control signals from the O/E converter 214-sv or 215-sv.

Figure 4:
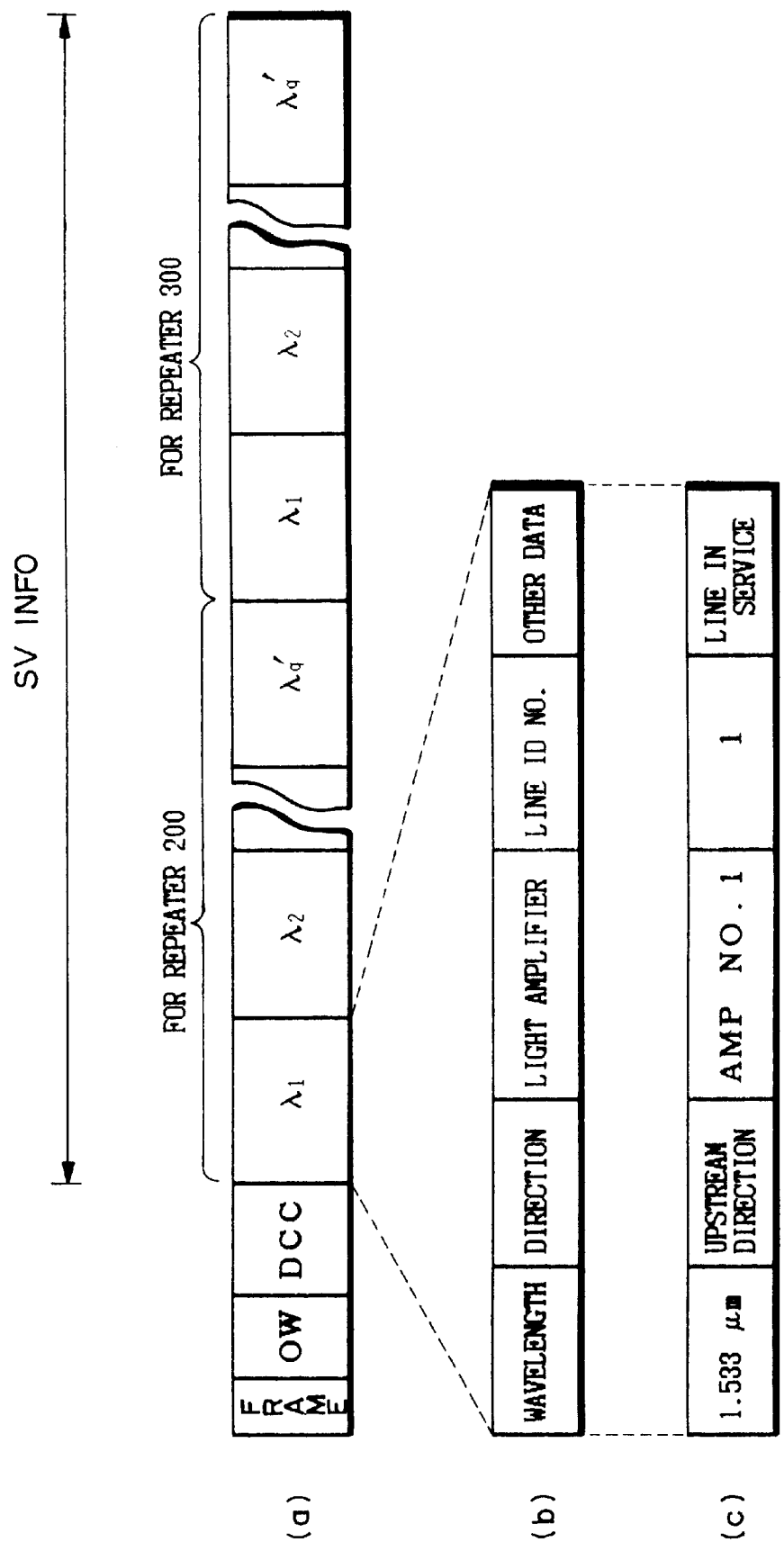
FIG. 4 is a diagram showing the composition of a supervisory control signal.

FIG. 4 is a diagram showing the format of a supervisory control signal. As shown in (a) of FIG. 4, the supervisory control signal consists of a frame bit (FRAME) for frame synchronization, an order wire (OW) block for a voice signal to exchange information between maintenance persons for maintenance and inspection, a data communication channel (DCC) block for information necessary for supervision of the optical transmission system, and a supervision information (SVINF) block for information about optical signals. The division for supervision information SVINF is divided into two sections corresponding to the two optical repeater equipment 200, 300 to convey information about the transmission of the optical signals. Each of those sections is divided into time slots as many as the number of wavelengths (p+q'). As shown in (b) of FIG. 4, the control unit 220 inserts an optical signal wavelength, an optical signal direction, an optical amplifier No., and a transmission line ID No. to the corresponding time slots. For example, as shown in (c) of FIG. 4, for an optical signal of wavelength λ1 transmitted along the transmission line 1, the control unit 220 sets "1.533 um" as the wavelength of the optical signal, "upstream" as the direction of the optical signal, "AMP No. 1" as the light amplifier No., "1" as the line ID No., and "line in service" as another item of this optical signal in the time slot for λ1.

The control unit 220 outputs a supervisory control signal, together with the above-mentioned items of information, to the E/O converter 230. The E/O converter 230 generates a supervisory control optical signal from a supervisory control signal, and supplies the supervisory control signal to an optical switch 240. In response to a switching command from the control unit 220, to be more precise, according to a switching command from the supervisory equipment 800, the optical switch 240 switches over the output line of the supervisory control signal λsv to insert the supervisory control ray into one of the transmission lines 1 to m. Consequently, the supervisory control signal λsv is inserted into one of the transmission lines 1 to m, which is selected by the optical switch 240 through the optical coupler 219 of one of the repeater units 210-1~m. Herein, for upstream, the signal is inserted through one of the optical couplers 219 while for downstream, the signal is inserted through one of the optical couplers 211.

To provide against failures in the transmission line along which the supervisory control signal λsv is transmitted, it is desirable to send a supervisory control signal λsv toward both of optical terminal equipment 100 and 400. To reinforce the supervisory control function, it is required to transfer supervisory control information collected in the optical terminal equipment 400, to the supervisory equipment 800 located at a remote place, or provide the optical terminal equipment 400 with the same function as in the supervisory equipment 800.

Returning to the optical terminal equipment 100, to give a more detailed description of the receiving function of the optical terminal equipment 100, the optical terminal equipment 100 separates out a supervisory control signal λsv from the two pieces of optical repeater equipment 200, 300 by its optical wavelength multiplexer/demultiplexer unit 130-1~m, and outputs the supervisory control signal to the optical switch 160. Like in switching over the lines for supervisory control signal in the optical repeater equipment, the control unit 140 selects a supervisory control signal λsv by using the optical switch 160 in response to a switching command from the supervisory equipment 800. The O/E converter 150 converts the selected supervisory control signal λsv into an electric signal, and outputs the electric signal, in other words, a supervisory control signal to the control unit 140. The control unit 140 extracts information about the respective optical signals from the time slots of supervisory control information in the received supervisory control signal, and outputs extracted supervisory control information to the supervisory equipment 800. The supervisory equipment 800 creates a supervisory control table for use in supervision of the whole optical transmission system from received supervisory control information.

Figure 5:
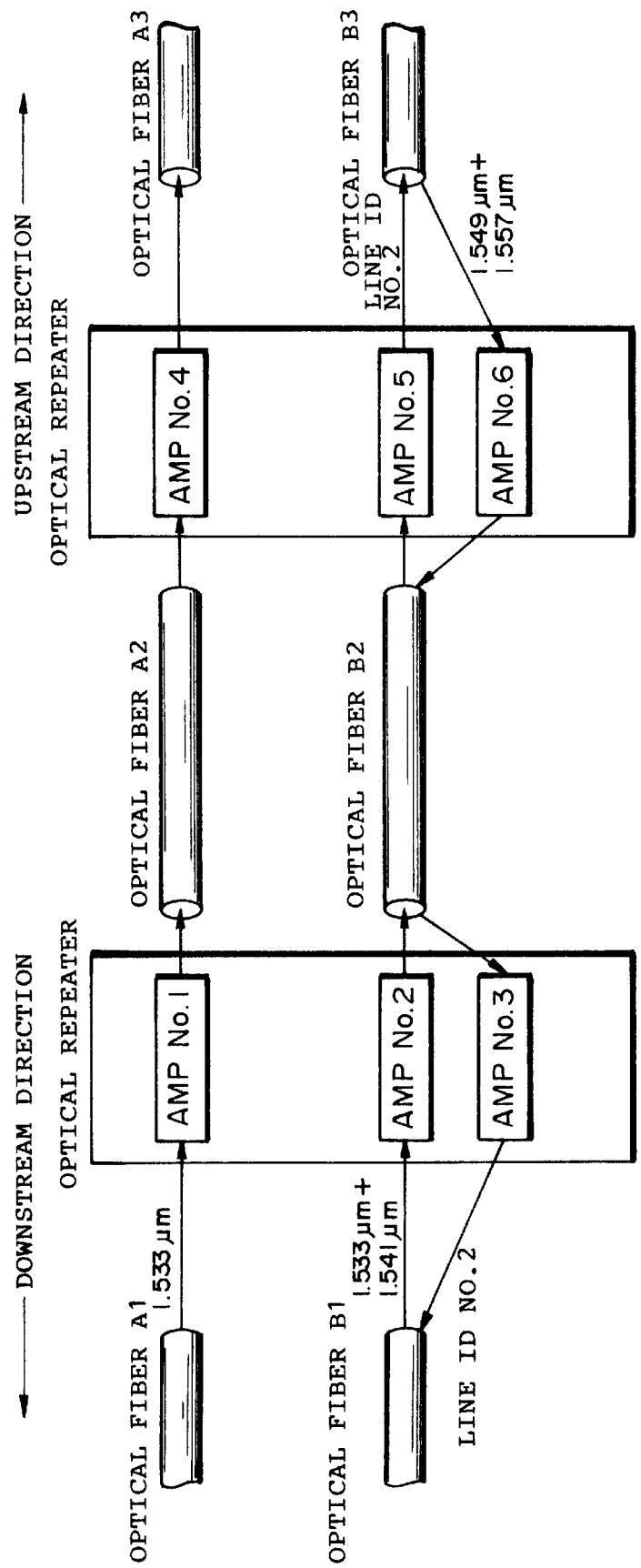
FIG. 5 is a diagram showing an example of connections of the optical transmission system.
Figure 7:
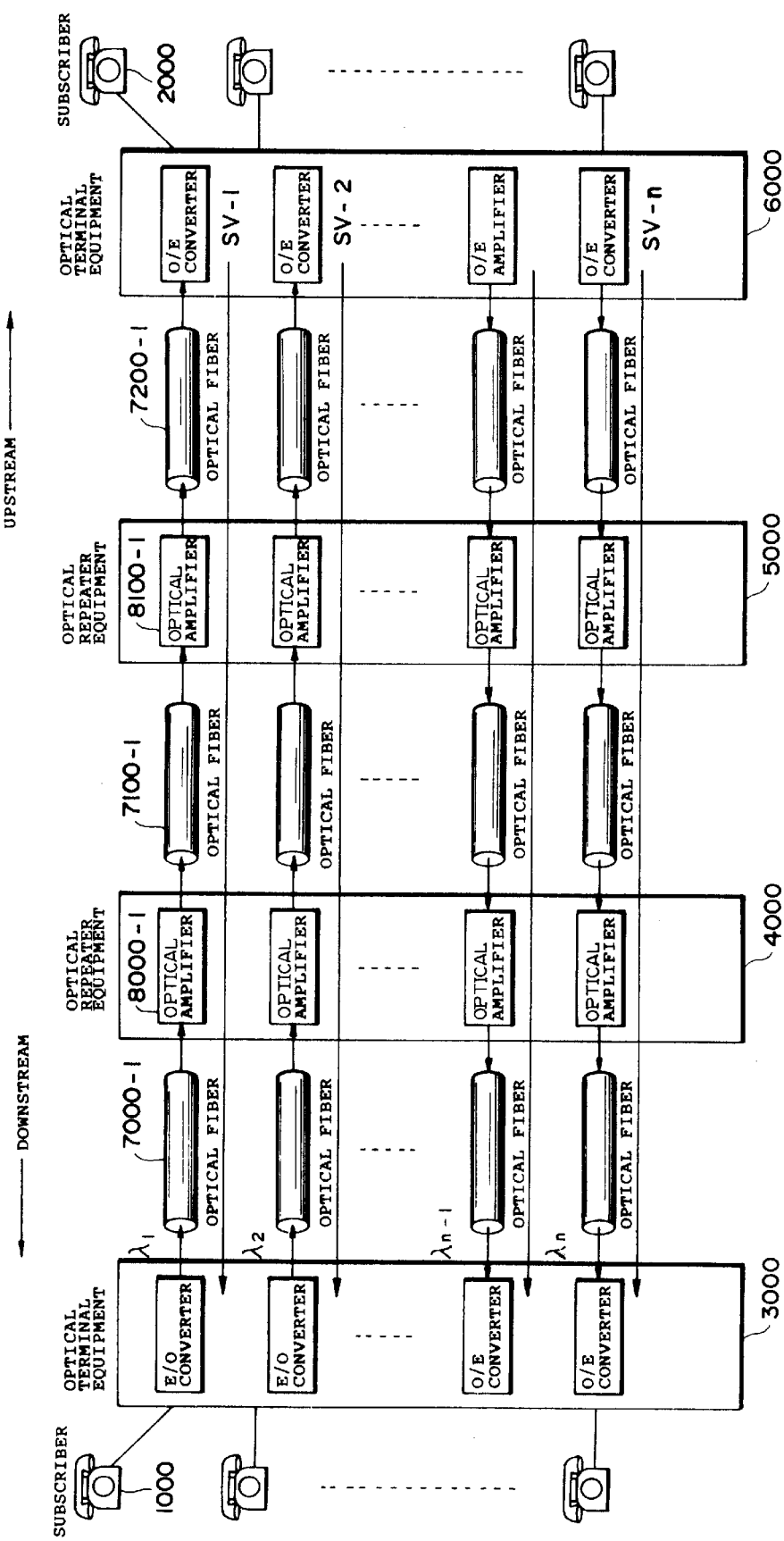
FIG. 7 is a diagram showing the configuration of the conventional-type optical transmission system of the non-regenerative repeat method.

FIG. 5 is a diagram showing an example of connections of the optical transmission system. FIG. 6 is a supervisory control table created by the supervisory equipment. In the optical transmission system of this embodiment, there are two pieces of optical repeater equipment, an optical signal (1.533 μm) is transmitted in the upstream direction along one optical fiber, two optical signals (1.533 μm, 1.541 μm) are transmitted in the upstream direction along one optical fiber, and other two optical signals (1.549 μm, 1.557 μm) are also transmitted in the downstream direction along the same latter optical fiber. In the optical transmission system, the optical fiber Nos. The light amplifier (AMP) Nos., and the line ID Nos. are assigned as shown in FIG. 6.

By following the procedure described above, the supervisory control table creating unit 810 in the supervisory equipment 800 collects information about the transmission of optical signals, that is, supervisory control information from the pieces of optical repeater equipment of the optical transmission system. From the collected supervisory control information, a supervisory control table necessary for supervision of the optical transmission system is created as shown in FIG. 6. This table makes it possible to accurately decide which fiber or which light amplifier should be checked when a failure occurs in the transmission of optical signals. For example, if a failure occurs in the transmission of an optical signal of a wavelength 1.541 μm, it is possible to make a quick and accurate decision that the optical fibers B1, B2 and B3 and the light amplifier No. 2 and No. 5 should be checked.

In the optical transmission system according to this embodiment of the invention, information about all optical repeater equipment is collected by using only one supervisory control signal λsv. Therefore, even in the installation of an additional line, it is possible to manage increased monitored objects due to the addition of a line, by only slightly altering the data format of the supervisory control signal in a supervisory control light signal without using any more supervisory control light ray. Consequently, it is possible to install additional lines at lower cost than in the conventional optical transmission system.

What is claimed is:

1. Optical repeater equipment having optical amplifiers for amplifying multiplexed optical signals, said optical repeater equipment to be placed between first and second pieces of optical terminal equipment, said first piece of optical terminal equipment having a function to form a multiplexed optical signal by multiplexing a plurality of optical signals of mutually different wavelengths, and to collect information for supervision of the transmission of the multiplexed optical signal, said optical repeater equipment comprising:

first extracting means for extracting part of the multiplexed optical signal including respective parts of the plurality of optical signals of mutually different wavelengths;

first separating means for separating the extracted part of the multiplexed optical signal into the component rays of mutually different wavelengths;

first detecting means for detecting the wavelengths of the separated component rays;

generating means for generating a supervisory control signal including a signal showing detected wavelengths of the separated component rays; and sending means for sending the supervisory control signal in the direction of the first piece of optical terminal equipment.

2. Optical repeater equipment according to claim 1, further comprising second extracting means having the same extracting function as in said first extracting means;

second separating means having the same separating means as in said first separating means; and second detecting means having the same detecting function as in said first detecting means, wherein said first extracting means, separating means, and detecting means compose a first detecting mechanism for detecting wavelengths of component rays of the multiplexed optical signal transmitted in the direction of said first optical terminal equipment and the second extracting means, separating means, and detecting means compose a second detecting mechanism for detecting wavelengths of component rays of the multiplexed light transmitted in the opposite direction, and wherein the supervisor control signal generated by said generating means includes information on a correspondence relationship between the wavelengths of the separated component rays and the directions in which the separated component rays are transmitted.

3. Optical repeater equipment according to claim 1, wherein said optical amplifiers are assigned identification Nos. in advance, and wherein said generating means generates a supervisory control signal including information on a correspondence relationship between the identification Nos. of said optical amplifiers and the wavelengths of the component rays of the optical signal transmitted by said optical amplifiers.

4. Optical repeater equipment according to claim 1, further comprising reading means for reading transmission line identification Nos. given to the multiplexed plurality of optical signals of mutually different wavelengths by the first optical terminal equipment, wherein said generating means generates a supervisory control signal including information on a correspondence relationship between the wavelengths of the multiplexed optical signal and the transmission line identification Nos.

5. Optical repeater equipment according to claim 1, wherein said generating means adds a supervisory control signal generated by said repeater equipment to another supervisory control signal received from the second optical equipment, to generate another supervisory control signal.

6. Optical repeater equipment according to claim 1, wherein said sending means sends the supervisory control signal by using supervisory control light having a wavelength different from the wavelengths of the multiplexed optical signal.

7. Optical repeater equipment according to claim 1, wherein the second piece of optical terminal equipment also has the same multiplexing and information collecting functions as the first piece of optical terminal equipment.

8. An optical transmission system having first optical terminal equipment for forming a multiplexed optical signal by multiplexing a plurality of component rays of mutually different wavelengths, supervisory equipment for collecting information on supervision of the transmission of the multiplexed optical signal, and optical repeater equipment provided with optical amplifiers, for transmitting the multiplexed optical signal, wherein said optical repeater equipment comprises:

first extracting means for extracting part of the multiplexed optical signal including respective parts of the plurality of optical signals of mutually different wavelengths;

first separating means for separating the extracted part of the multiplexed signal into component rays of the different wavelengths;

first detecting means for detecting the wavelengths of the separated component rays;

generating means for generating a supervisory control signal including a signal showing detected wavelengths of the separated component rays; and sending means for sending the supervisory control signal to said supervisory equipment, and wherein said supervisory equipment comprises creating means for creating a supervisory control table for supervision of the transmission of the multiplexed optical signal.

9. Optical transmission system according to claim 8, further comprising second optical terminal equipment having the same multiplexing function as has said first optical terminal equipment, wherein said optical repeater equipment further comprises
second extracting means having the same extracting function as has said first extracting means;
second separating means having the same separating function as has said first separating means; and
second detecting means having the same detecting function as has said first detecting means, wherein said first extracting means, separating means, and detecting means compose a first detecting mechanism for detecting wavelengths of component rays of the multiplexed optical signal transmitted in the direction of said first optical terminal equipment, and said second extracting means, separating means, and detecting means compose a second detecting mechanism for detecting wavelengths of component rays of the multiplexed optical signal transmitted in the opposite direction, wherein said generating means generates a supervisory control signal including information on a correspondence relationship between the detected wavelengths of the component rays and directions in which the component rays are transmitted, and wherein said creating means creates said supervisory control table from the information on the correspondence relationship between the detected wavelengths of the component rays and the directions in which the component rays are transmitted, included in the supervisory control signal.

10. An optical transmission system according to claim 8, wherein said generating means generates a supervisory control signal from an amplifier/number correspondence relationship between identification Nos. assigned to said optical amplifiers in advance and the wavelengths of the component rays relayed by said optical amplifiers, so that the generated supervisory control signal contains information indicative of the amplifier/number correspondence relationship, and wherein said creating means creates said supervisory control table from the correspondence relationship between the identification Nos. of said optical amplifiers and the wavelengths of the component rays contained in the supervisory control signal.

11. An optical transmission system according to claim 8, further comprising a plurality of transmission lines to transmit a plurality of multiplexed light, wherein said optical terminal equipment assigns transmission line identification Nos. to the plurality of multiplexed optical signal, wherein said optical repeater equipment comprises reading means for reading the transmission line identification Nos., wherein said generating means generates a supervisory control signal including information on a correspondence relationship between the wavelengths of the component rays and the transmission line identification Nos., and wherein said creating means creates said supervisory control table from the information on correspondence relationship between the wavelengths of the component rays and the transmission line identification Nos. included in the supervisory control signal.

12. An optical transmission system according to claim 8, wherein said optical repeater equipment has means for transmitting the supervisory control signal received from outside, by the non-generative repeat method.

13. Optical repeater equipment having light amplifiers for amplifying an optical signal, said optical repeater equipment to be placed between first and second optical terminal equipment, said first optical terminal equipment having a function to collect information for supervision of the transmission of the optical signal, said optical repeater equipment comprising:

a first detecting mechanism for detecting a wavelength of a first optical signal transmitted in the direction of said first optical terminal equipment, including
first extracting means for extracting part of the first optical signal, and
first detecting means for detecting the wavelength of the first optical signal;

a second detecting mechanism for detecting a wavelength of a second optical signal transmitted in the opposite direction, including
second extracting means for extracting part of the second optical signal;
second detecting means for detecting the wavelength of the second optical signal,
generating means, responsive to either of the first and second optical signals for generating a supervisory control signal that includes information on a correspondence relationship between the detected wavelength of said either of the first and second optical signals and the direction of transmission thereof; and
sending means for sending said supervisory control signal in the direction of said first optical terminal equipment.

14. An optical transmission system for transmitting optical signals in opposite directions, including a. first and second optical terminal equipment respectively for forming first and second optical signals to be transmitted in opposite directions respectively toward the second and first optical terminal equipment, b. supervisory equipment for use in collecting information on supervision of the transmissions of the first and second optical signals; and c. optical repeater equipment that includes optical amplifiers and a signal detection mechanism, wherein the signal detection mechanism comprises:

(1) a first detecting mechanism for detecting a wavelength of the second optical signal, said first detecting mechanism having means for collecting the information on supervision of the transmission of the second optical signal, including
first extracting means for extracting part of the second optical signal, and
first detecting means for detecting a wavelength of the extracted part of the second optical signal; and
(2) a second detecting mechanism for detecting a wavelength of the first optical signal, said second detecting mechanism having means for collecting the information on supervision of the transmission of the first optical signal, including
second extracting means for extracting part of the second optical signal, and
second detecting means for detecting a wavelength of the extracted part of the second optical signal;

d. said optical repeater equipment further comprising
(i) generating means, responsive to the first and second optical signals, for generating a supervisory control signal including a signal that includes information on a correspondence relationship of the wavelength and direction of transmission of each first and second optical signal detected by said signal detection mechanism, and
(ii) sending means for sending said supervisory control signal to said supervisory equipment, wherein said supervisory equipment comprises creating means for creating a supervisory control table from the information on the correspondence relationship between the wavelength and direction of transmission included in the supervisory control signal, the supervisory control table for supervision of the transmission of the second optical signal.

* * * * *